US009523770B1

(12) United States Patent
Ruffa

(10) Patent No.: US 9,523,770 B1
(45) Date of Patent: Dec. 20, 2016

(54) MULTIPLE FREQUENCY PARAMETRIC SONAR

(71) Applicant: Anthony A Ruffa, Hope Valley, RI (US)

(72) Inventor: Anthony A Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/867,177

(22) Filed: Sep. 28, 2015

(51) Int. Cl.
G01S 15/02 (2006.01)
G01S 15/88 (2006.01)

(52) U.S. Cl.
CPC ............ *G01S 15/02* (2013.01); *G01S 15/88* (2013.01)

(58) Field of Classification Search
CPC ................................ G01S 15/02; G01S 15/88
USPC .......................................................... 367/92
See application file for complete search history.

(56) References Cited

U.S. PATENT DOCUMENTS

| 3,924,259 | A | * | 12/1975 | Butler | ............... B06B 1/0622 310/326 |
| 3,964,013 | A | | 6/1976 | Konrad | |
| 4,320,474 | A | | 3/1982 | Huckabay | |
| 4,471,473 | A | * | 9/1984 | Ziese | ............... G01S 15/42 367/103 |
| 4,712,201 | A | * | 12/1987 | Lagier | ............... F41G 7/228 367/92 |
| 6,704,247 | B1 | | 3/2004 | Ruffa | |
| 7,319,639 | B2 | * | 1/2008 | Heyman | ............... G01V 1/001 367/92 |
| 7,561,613 | B2 | | 7/2009 | Giannakis | |
| 2004/0174770 | A1 | | 9/2004 | Rees | |
| 2007/0274152 | A1 | | 11/2007 | Rees | |
| 2012/0186422 | A1 | | 7/2012 | Cuschieri | |

OTHER PUBLICATIONS

Bernard D. Steinberg, Principles of Aperture and Array System Design, chapters in a book, 1976, pp. 123-169, John Wiley & Sons, Inc., USA.

* cited by examiner

*Primary Examiner* — Daniel Pihulic
(74) *Attorney, Agent, or Firm* — James M. Kasischke; Michael P. Stanley

(57) ABSTRACT

A method of use for parametric sonar is provided that utilizes an acoustic beam formed at a difference frequency generated by non-linear interaction of acoustic energy of primary frequencies. At least three primary frequencies are transmitted from a frequency source by amplifiers and acoustic projectors of the sonar. The non-linear interaction of the primary frequencies produces at least three difference frequencies. The difference frequencies are received by a receiver array. Increased interaction increases efficiency linearly with the number of primary frequencies used. The increased bandwidth resulting from the use of multiple center frequencies can also produce signal processing gains and signal-to-signal ratio is also improved, especially at the lower difference frequencies.

8 Claims, 7 Drawing Sheets

MULTIPLE FREQUENCY PARAMETRIC SONAR

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF INVENTION

1) Field of the Invention

The present invention is a method for increasing the bandwidth of a parametric sonar system by using multiple primary frequencies rather than only two primary frequencies.

2) Description of Prior Art

Parametric sonar generates narrow beams at low frequencies by projecting sound at two distinct primary frequencies with high amplitudes. Nonlinear acoustic interaction of sound at the two primary frequencies generates sound at a difference frequency. For example: if sound is transmitted at 80 kHz and 83 kHz, there will also be sound at 3 kHz (the difference frequency). Sound is also generated at a "sum" frequency, but this usually is not useful since acoustic energy at that frequency attenuates faster than at the primary frequencies.

While parametric sonar can be useful for many applications, there are also drawbacks. For example: only the energy associated with the nonlinear interaction at the difference frequency is actually used. Acoustic energy of the primary frequencies such as at 80 kHz and 83 kHz attenuates quickly. Acoustic energy at the nonlinear interaction such as at 3 kHz attenuates slowly.

This energy resulting from the nonlinear interaction can be used for the sonar functions of detection, classification, localization and tracking. A narrower beam from the sonar reduces reverberation because the area insonified around a target is smaller with the result of less energy scattered back from the surrounding water. Scattered back energy typically represents three percent of the total acoustic energy projected.

For example, if an attempt is made to detect a target at a range of 1 kilometer with a beam width of four degrees; then the beam will insonify the target within a circle radius of 70 meters (note that the circle will be perpendicular to the direction of the beam). As a result, scattered energy will be received from the target (which is desired), but scattered energy will also be received from biologics and other small targets within the 70 meter circle (which is not desired). Biologics and other small targets are not wanted because they can obscure a signal.

If the beam width can be reduced to two degrees; the circle radius becomes 35 meters. However, the same scattered energy is received from the target, but less from the other volumetric targets within the circle. Parametric sonar provides a way to obtain narrower beams.

Relevant prior art references include Konrad (U.S. Pat. No. 3,964,013) which discloses that an output frequency range of a speech generator was between 0.5 and 2.5 kHz. The output frequency of oscillator was 22 kHz, giving rise to the frequencies of the signals in the output of a modulator to be 19.5 to 21.5 and 22.5 to 24.5 kHz. These signals cause cavitation adjacent or at the face of the transducer which in turn allows the difference frequency range (i.e., frequency range between 2.5 kHz and 4.5 kHz to be generated).

Huckabay et. al. (U.S. Pat. No. 4,320,474) discloses an array of parametric sources. A source is shown as consisting of two primary sources, each of which is a planar circular transducer of radius (d/2) driven at or slightly below saturation at primary frequencies F1 and F2 by suitable means shown as a frequency source and amplifier. Saturation limited primary sources are operated in a kd region selected to provide a moderately directive radiation field, where k is the average wave number of the primary frequencies.

As shown in the reference, the primary source launches in a medium with dual frequency primary beams collimated in the near field and spherically spreading in the far field. The primary frequencies launched in the primary beams of each directional primary source interact and parametrically generate two difference frequency beams as the primary beams propagate. The difference frequency beams interfere and the coexistent primary radiations parametrically interact in a crosshatched common region; producing a resultant difference frequency beam.

Lagier (U.S. Pat. No. 4,712,201) discloses a schematic of a parametric sonar and the processing of the signals for control of the torpedo rudders. The signals received by transducers are processed by reception assemblies. Item no. 60 of the reference is a decision circuit using signals at the primary and secondary frequencies and item no. 70 represents the torpedo direction and dive rudder controls.

Piloting of the vehicle is done in a known manner with the phase of the signals received by the transducers used to produce reception channels at the primary frequencies and other transducers arranged for this purpose at a vertical distance. For example, an oscillator transmits on ten frequencies, three times in succession. The reason for this sequential transmission is that the high frequency transducer power capacity is limited and does not allow transmission on all the frequencies in every direction simultaneously at the acoustic power level required for a parametric output.

The Lagier reference allows multiple frequencies to be transmitted simultaneously to form multiple parametric beams. However, the multiple nonlinear interactions are not taken advantage of in order to generate additional efficiencies, bandwidth, and SNR. This can be seen most clearly in paragraph 2, lines 15-24 of the reference. The primary high frequencies are denoted F and $F_i$, where i represents a plurality of frequencies. The difference frequencies generated are listed as $f_1=F-F_1$, $f_2=F-F_2$, up to $f_q=F-F_q$.

Also, the Lagier reference does not teach or imply the use of difference frequencies such as $f_{12}=F_1-F_2$, $f_{23}=F_2-F_3$, etc., which involve multiple nonlinear interactions. Instead, each beam is steered in a different direction. The increased efficiency, bandwidth, and SNR arising from the use of multiple nonlinear interactions is not realized.

Ruffa (U.S. Pat. No. 6,704,247) provides first and second signal transducers in communication with a liquid environment. The first transducer is joined to a first amplifier and the second transducer is joined to a second amplifier. The amplifiers are joined to first and second oscillators. The second oscillator is capable of generating a signal at a second frequency. The transducers are oriented so that transmitted acoustic waves overlap in an overlap region.

Giannakis et. al. (U.S. Pat. No. 7,561,613) discloses a transmitter and includes a user code generator that generates digital carrier multi-band user codes for a baseband UWB signal of a user in UWB system. Different from orthogonal frequency division multiple access (OFDMA) in narrow-band systems; the baseband SC and MC-UWB spreading codes described herein are real. UWB signaling with either the SC or the MC spreading codes occupies multiple frequency bands and the resulting multi-band transmission has multipath diversity gains.

Rees (United States Patent Publication No. 2004/0174770) illustrates a multiple-projector array embodiment. In such an embodiment, it is possible to apply the transmitter-side adaptive equalization of the Guass-Rees primary waveform as a feedback corrected amplitude and phase adjustment on a per frequency bin basis due to the subdivision of this waveform into multiple, contiguous but non-overlapping frequency bins in filters. This application has gone abandoned.

Rees (United States Patent Publication No. 2007/0274152) discloses an embodiment of a transmitter. The variant of the transmitter has suitable components in place of a computer that is also imbedded into the transmitter, etc. redesignated as a transmitter 2B. A multiple-projector array embodiment is illustrated. This application has gone abandoned.

Cushchieri et. al. (United States Patent Publication No. 2012/0186422) discloses a transducer-array assembly. The assembly may include one of more separate arrays and is operable to generate various acoustic waves, such as low-frequency broadband (LFBB) sonar waves. For example: the assembly may include a transmit array and a receive array. In an embodiment, the transmit array may be approximately three feet long by twenty inches high, with an active area of approximately twelve inches long by eight inches wide and the receive array may be approximately four feet long by twenty inches high. And both the transmit and receive arrays may include multiple transducer elements that the controller may independently process, or otherwise control, to shape the transmitted and received acoustic waves into beams, and to control the directions of these beams.

Based on the teachings of the prior art references, it evident that there is a continuing need for increased efficiency by the use of multiple frequencies. Although, the very low efficiency of traditional parametric sonar has always severely limited the applicability of the sonar; it feasible that this limitation can be overcome.

SUMMARY OF THE INVENTION

It is therefore a primary object and general purpose of the present invention to increase the efficiency of parametric sonar.

It is a further object of the present invention to enable the use of multiple frequencies of parametric sonar.

In order to attain the objects of the invention, a transmitters capable of transmitting acoustic energy at multiple frequencies are provided. Each transmitter includes a power amplifier and an acoustic projector for each frequency source. A receiver array is also provided which can receive the multiple frequencies. A single or multiple receiver arrays known to those ordinarily skilled in the art may be used.

This invention uses a combinatorial increase in the number of usable difference frequencies that occurs as the number of transmitters is increased. Since the number if difference frequencies increases much faster than the number of transmitters; making use of this effect increases the efficiency of parametric sonar.

BRIEF DESCRIPTION OF THE DRAWINGS

Other objects, features and advantages of the present invention will become apparent upon reference to the following description of the preferred embodiments and to the drawings, wherein.

DETAILED DESCRIPTION OF THE INVENTION

Exemplary embodiments of methods in accordance with the present invention extend parametric sonar to more than two primary frequencies. To assist in defining the present invention, parametric sonar makes use of an acoustic beam formed at a difference frequency generated by non-linear interaction of acoustic energy at two primary frequencies. A primary frequency is one generated by a transducer or amplifier/acoustic projector. The sum and difference frequencies are generated by the non-linear interaction between the primary frequencies. The main improvement of the present invention is an increase in efficiency because of the use of multiple frequencies.

Substantively narrow beams are formed as follows. The beam width is governed by a ratio of the aperture length "L" to the wavelength "$\lambda$". The aperture is the length "L" of a line array of receivers that is oriented perpendicular to the direction of propagation of an incoming acoustic plane wave. If primary frequencies are 80 and 83 kHz, the wavelength $\lambda$ is approximately twenty-seven times greater than that at 3 kHz. The beamwidth is governed by the L/$\lambda$ at primary frequencies and is retained after the nonlinear interaction. Thus, narrow beams can be attained at a fraction of the aperture needed by conventional sonar (with the drawback of low efficiency). These occurrences are well known in the use of parametric sonar.

Figure 1:
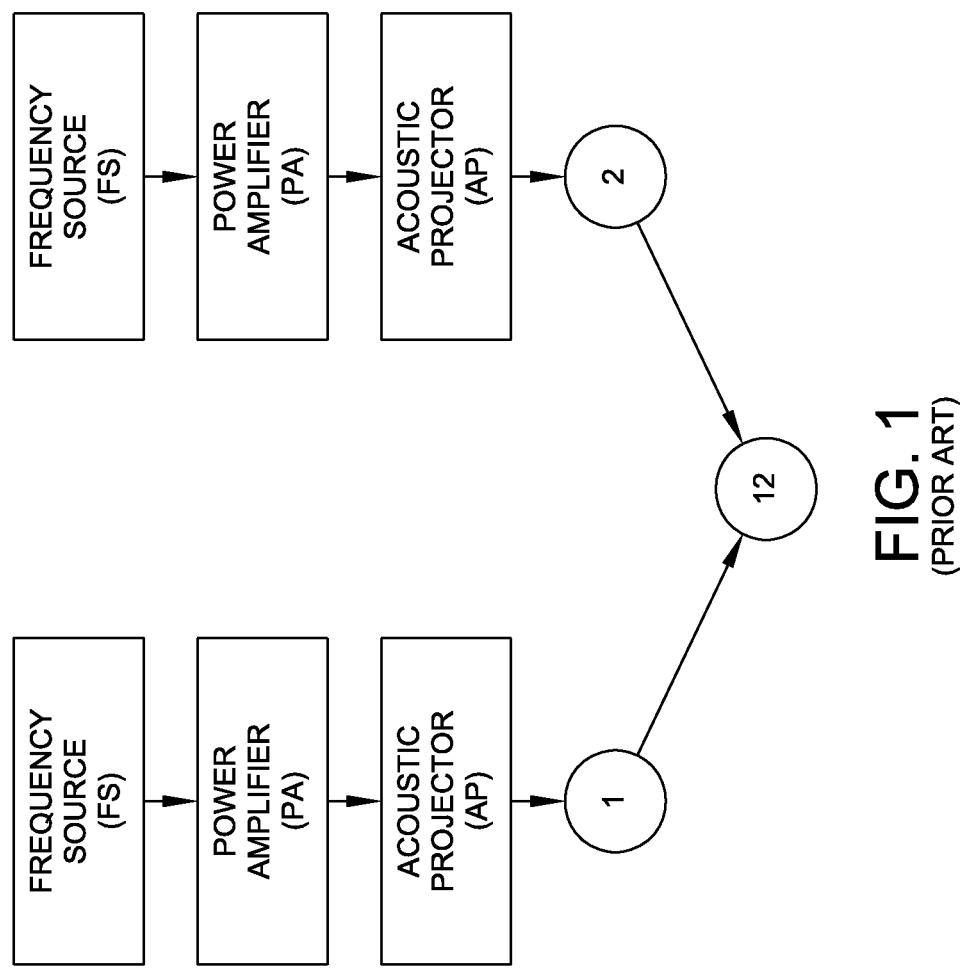
FIG. 1 is a schematic depicting a prior art two primary frequency arrangement.
Figure 2:
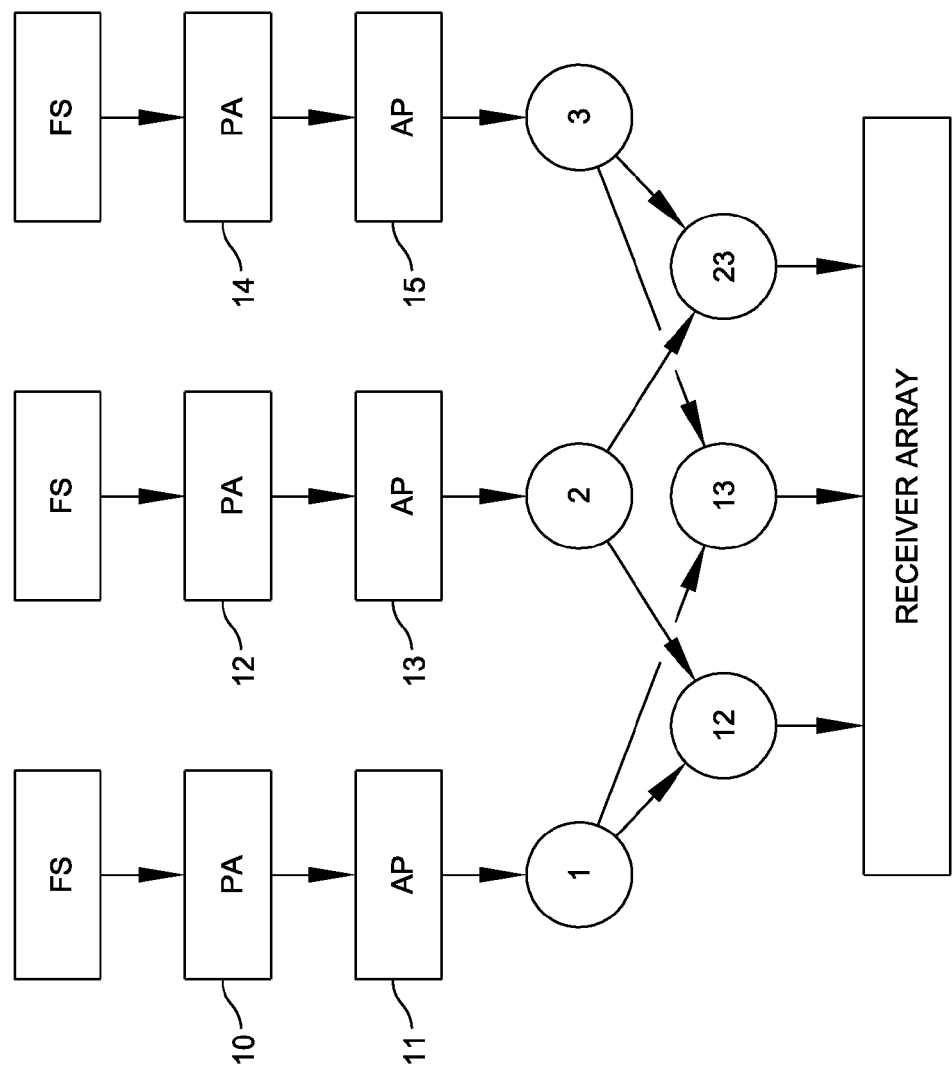
FIG. 2 is a schematic depicting a three primary frequency arrangement in accordance with the present invention.

Referring to the prior art example in FIG. 1; a frequency source (FS) transmitted by a power amplifier (PA) and acoustic projector (AP) produce a primary frequency "1" and a primary frequency "2" with a difference frequency "12". As enabled by the invention and shown in FIG. 2, three primary frequencies (1, 2, 3) can be transmitted from a frequency source by amplifiers 10, 12 and 14 and acoustic projectors 11, 13 and 15. The transmission produces three difference frequencies (12, 13, and 23), or one difference frequency (interaction) per frequency. The difference frequencies are received by a receiver array 100. This increased interaction represents a substantive improvement in efficiency over one interaction with two frequencies (i.e., 0.5 interactions per primary frequency). The bandwidth also increases by one hundred percent.

Figure 3:
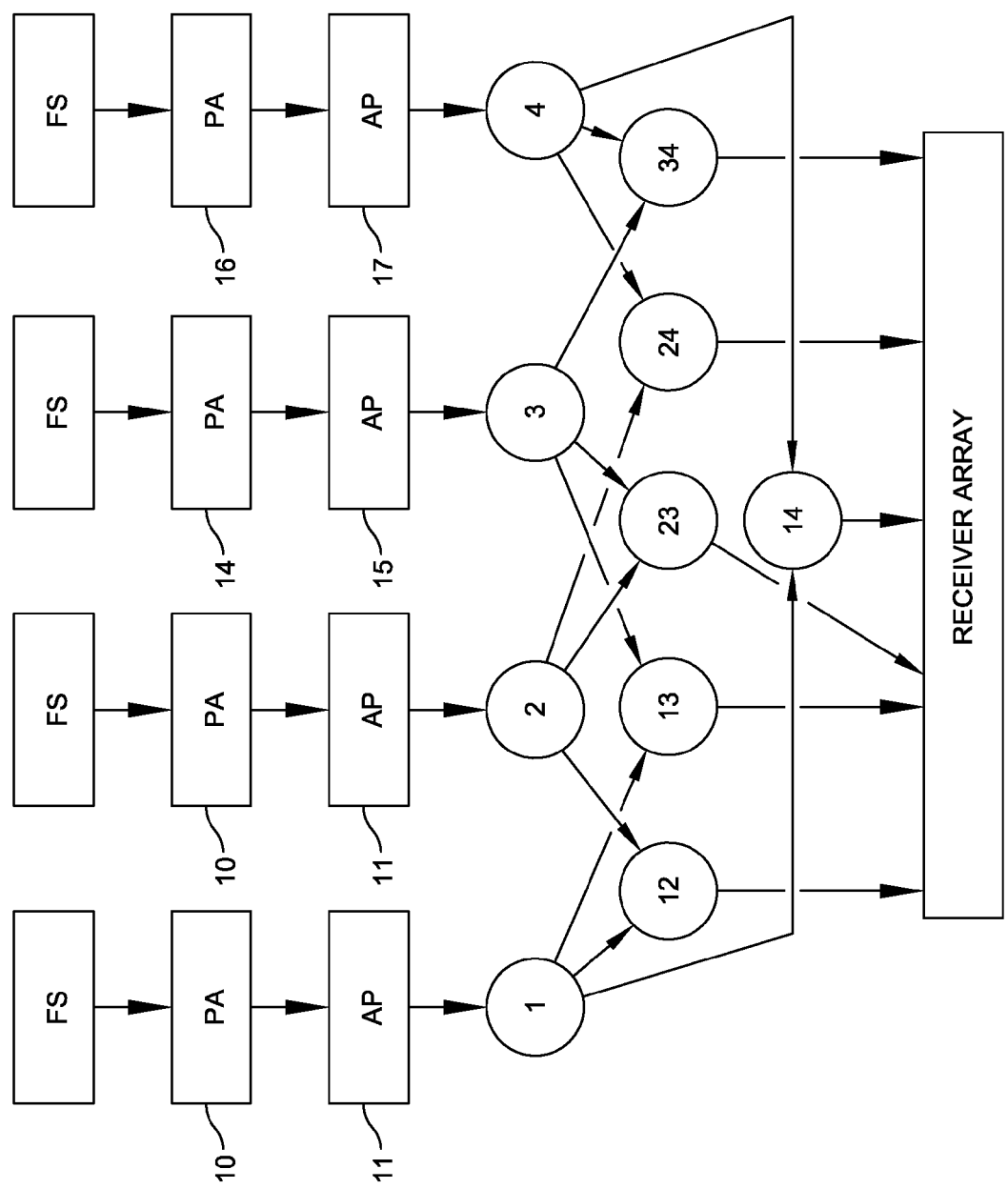
FIG. 3 is a schematic depicting a four primary frequency arrangement in accordance with the present invention.

Continuing the combinatorial effect in FIG. 3, four primary frequencies (1, 2, 3, 4) are transmitted by power amplifiers 10, 12, 14 and 16 and acoustic projectors 11, 13, 15 and 17. The transmission leads to six nonlinear interactions (12, 13, 14, 23, 24 and 34), or 1.5 per frequency and an even greater bandwidth. The interactions or difference frequencies are received by the receiver array 100.

The difference frequency bands generated are not contiguous in that the difference frequency bands have center frequencies of 3 kHz, 6 kHz, 9 kHz and 12 kHz. However, the bands are still useful for signal generating functions such as a matched filter.

Figure 4:
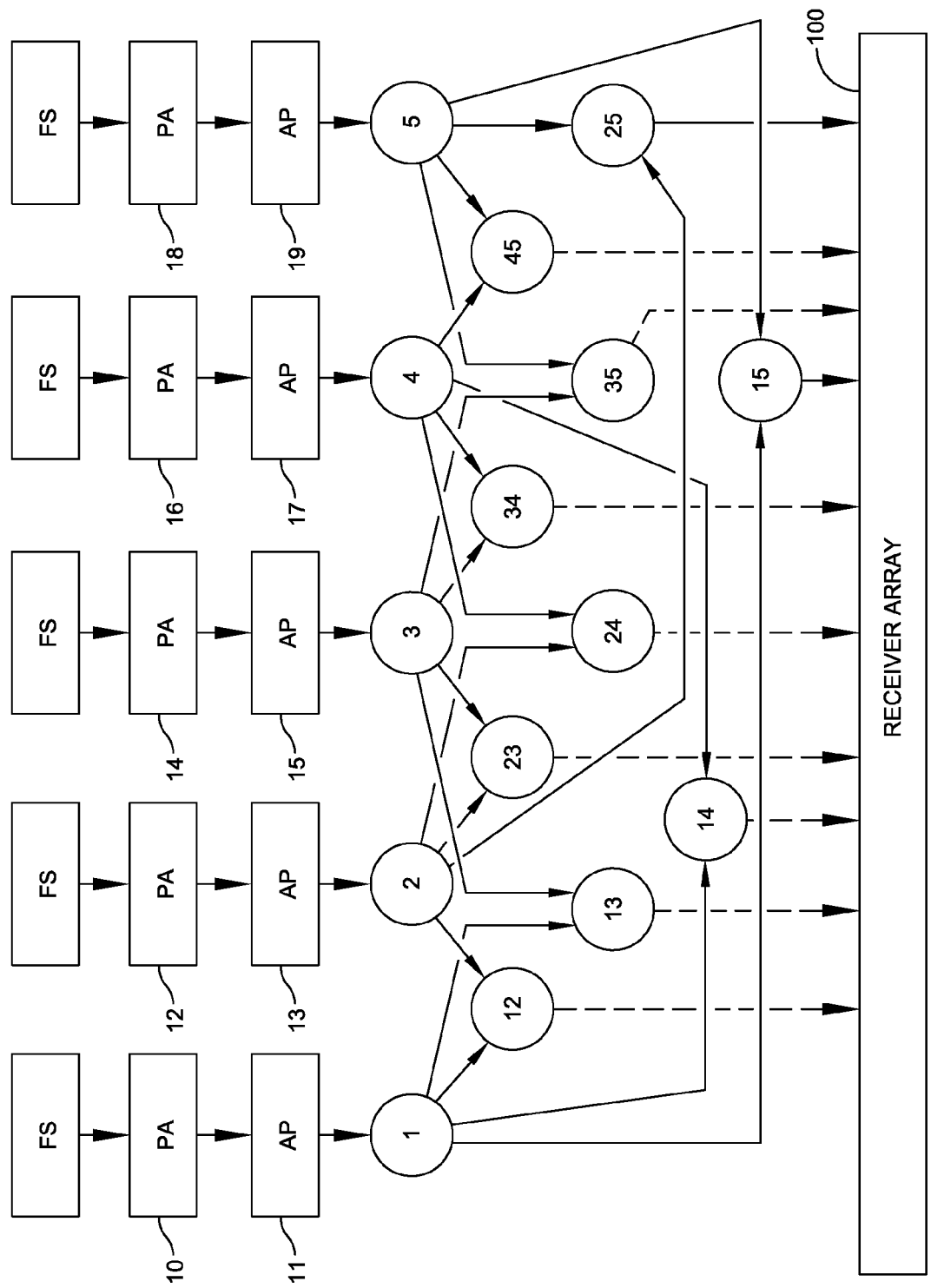
FIG. 4 is a schematic depicting a five primary frequency arrangement in accordance with the present invention.

As shown in FIG. 4, five primary frequencies (1, 2, 3, 4, 5) are transmitted by power amplifiers 10, 12, 14, 16 and 18 and acoustic projectors 11, 13, 15, 17 and 19. The transmission leads to leads to ten nonlinear interactions (12, 13, 14, 15, 23, 24, 25, 34, 35 and 45). The interactions or difference frequencies (shown in the figure as dotted lines) are received by the receiver array 100.

The difference frequencies can be as much as 3, 6, 9 and 12 kHz. Nyquist criteria requires element spacing on the receiver array 100 to be $\lambda/2$ or smaller in order to avoid aliasing, where $\lambda=c/f$ is the wavelength, c is the speed of sound in water and f is the frequency. At 3 kHz, the spacing has to be 0.5 meters or smaller. At 12 kHz, the spacing should be 0.125 or smaller, etc. Smaller spacing on the receiver array 100 (to accommodate for higher frequencies) is not done because it is not needed for conventional systems. A conventional system has only two primary frequencies and one difference frequency. For example, if the difference frequency is 3 kHz; the receiver array 100 is needed only for a center frequency of 3 kHz.

Consider a parametric system with primary frequencies at 80 kHz and 83 kHz, with a 1 kHz bandwidth at both frequencies: two at 3 kHz and one at 6 kHz. Additional primary frequencies can be added as follows: (1) Primary frequencies of 80, 83 KHz can have three difference frequencies (kHz) with a 3% efficiency and 1 Khz of bandwidth; (2) Primary frequencies of 80, 83, 86 KHz can have 3, 3 and 6 difference frequencies (kHz) with a 6% efficiency and 2 Khz of bandwidth; (3) Primary frequencies of 80, 83, 86, 89 KHz can have 3, 3, 3, 6, 6 and 9 difference frequencies (kHz) with a 9% efficiency and 3 Khz of bandwidth; and (4) Primary frequencies of 80, 83, 86, 89, 92 KHz can have 3, 3, 3, 3, 6, 6, 6, 9, 9 and 12 difference frequencies (kHz) with a 12% efficiency and 4 Khz of bandwidth.

The efficiency increases linearly with the number of primary frequencies used. The receiver array 100 is also required to accommodate higher frequencies to utilize the increased energy. Accordingly, a system employing five frequencies should have a receiver array that can accommodate center frequencies ranging from 3 kHz to 12 kHz.

Figure 5:
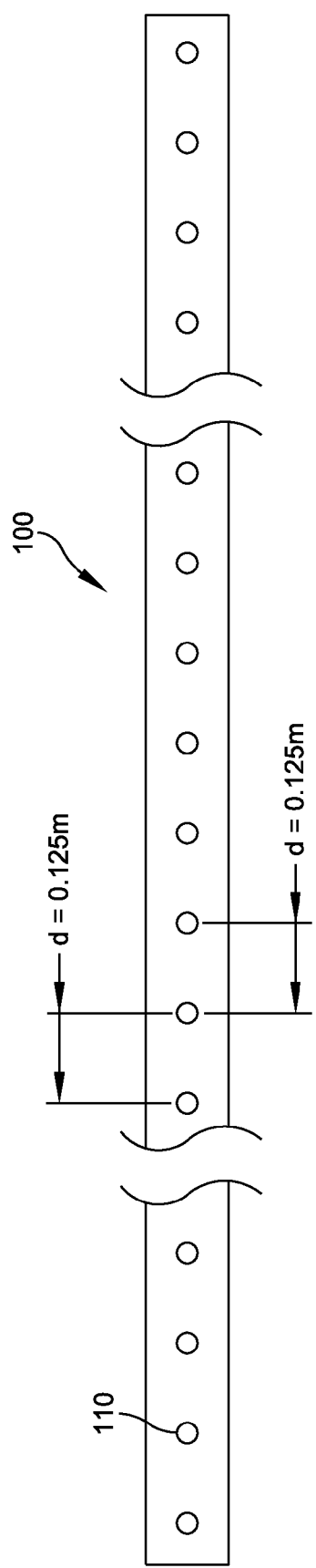
FIG. 5 is a schematic depicting a receiver array for use with the present invention, the receiver array comprising equally spaced hydrophones.

An optimal receiver array 100 is depicted in FIG. 5. In the figure, hydrophones 110 are evenly spaced on the receiver array 100. Although expensive, the array 100 of evenly spaced hydrophones can accommodate frequencies of 3 kHz, 6 kHz, 9 kHz and 12 kHz without aliasing.

Figure 6:
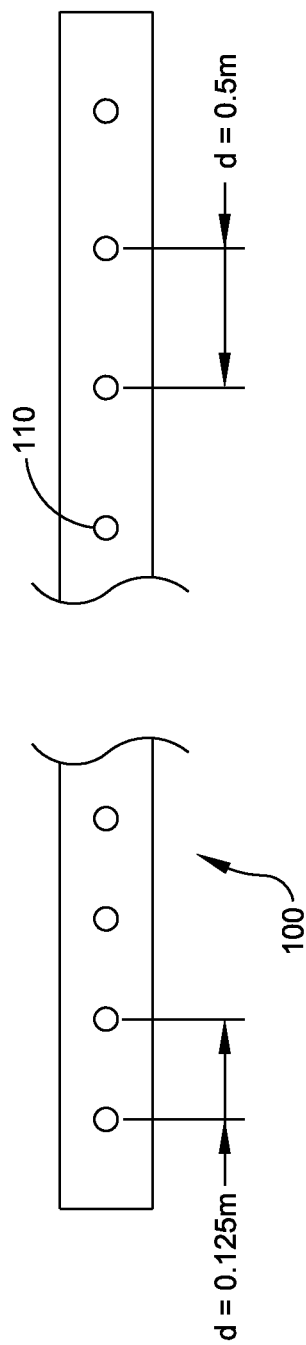
FIG. 6 is a schematic depicting a receiver array for use with the present invention, the receiver array comprising non-equally spaced hydrophones.

A first variant of the receiver array 100 is depicted in FIG. 6. In the figure, the hydrophones 110 step up in spacing in that spacing between hydrophones increases linearly from 0.125 meters at one end to 0.5 meters at the other end. This known and comparatively less expensive variant is supported and described by the "Principles of Aperture and Array System Design" by Bernard D. Steinberg (pages 123-138).

Figure 7:
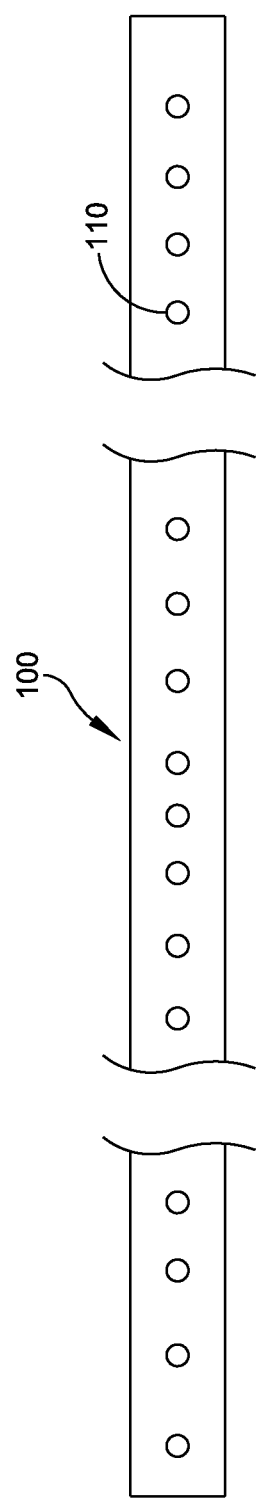
FIG. 7 is a schematic depicting a receiver array for use with the present invention, the receiver array comprising randomly spaced hydrophones.

A second variant of the receiver array 100 is depicted in FIG. 7. In the figure, the hydrophones 110 are spaced randomly but uniformly distributed. This known and least expensive variant is supported and described by the "Principles of Aperture and Array System Design" by Bernard D. Steinberg (pages 139 -169).

The increased bandwidth resulting from the use of multiple center frequencies can also produce signal processing gains. For example; the achievable time resolution associated with a matched filter is proportional to the inverse of the bandwidth of the transmitted signal. Thus, the use of five primary frequencies will increase the bandwidth by a factor of four, leading to an improvement in the achievable time resolution by a factor of four.

The signal-to-signal ratio (SNR) is also improved, especially at the lower difference frequencies. When five primary frequencies are used; the SNR at 3 kHz is four times greater than that associated with two primary frequencies (a 12 dB gain). This occurs when each of the four nonlinear interactions (having a difference frequency of 3 kHz) have waveforms that add coherently, which can be made part of the transmitting system electronics.

Adding primary frequencies can be done either with additional sources (e.g., one source per primary frequency), or with a single source if its transmit bandwidth can accommodate all of the primary frequencies. For example: if three primary frequencies are needed at 80 kHz, 83 kHz and 86 kHz; a single source could be used that transmits energy centered at 83 Hz (if the transmitter has a bandwidth of 6 kHz) so that the signals at 80 kHz, 83 kHz and 86 kHz could be transmitted simultaneously.

To take advantage of the improved efficiency and bandwidth; however, the receiver array 100 must be designed to accommodate all of the difference frequency bands associated with the nonlinear interactions. This can be done by changes in the electronics used for signal conditioning and processing. The changes occur from changes in the requirements of the receiver array.

It will be understood that many additional changes in details, materials, steps, and arrangements of parts which have been described herein and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for producing multiple frequency transmissions with a parametric sonar, said method comprising the steps of:
   transmitting at least three distinct primary frequencies from at least one source;
   generating a non-linear interaction of acoustic energy at each combination of the distinct primary frequencies;
   forming subsequent to said generating step, at least three acoustic beams, each at a difference frequency by the non-linear interaction of acoustic energy; and
   receiving the acoustic beams with a receiver array;
   wherein six difference frequencies are generated when four primary frequencies are transmitted.

2. A method for producing multiple frequency transmissions with a parametric sonar, said method comprising the steps of:
- transmitting at least three distinct primary frequencies from at least one source;
- generating a non-linear interaction of acoustic energy at each combination of the distinct primary frequencies;
- forming subsequent to said generating step, at least three acoustic beams, each at a difference frequency by the non-linear interaction of acoustic energy; and
- receiving the acoustic beams with a receiver array;
- wherein ten difference frequencies are generated when five primary frequencies are transmitted.

3. A method for producing multiple frequency transmissions with a parametric sonar, said method comprising the steps of:
- transmitting at least three distinct primary frequencies from at least one source;
- generating a non-linear interaction of acoustic energy at each combination of the distinct primary frequencies;
- forming subsequent to said generating step, at least three acoustic beams, each at a difference frequency by the non-linear interaction of acoustic energy; and
- receiving the acoustic beams with a receiver array;
- wherein said generating step is performed by at least one amplifier and at least one acoustic projector;
- wherein element spacing on the receiver array is $\lambda/2$ in order to avoid aliasing, where $\lambda=c/f$ is the wavelength, c is the speed of sound in water and f is the highest difference frequency.

4. The method in accordance with claim 3 wherein the receiver array includes hydrophones evenly spaced along the array such that the receiver array can accommodate multiple frequencies without aliasing.

5. The method in accordance with claim 3 wherein the receiver array includes hydrophones with increasing increments of spacing along the array such that the receiver array can accommodate multiple frequencies without aliasing.

6. The method in accordance with claim 3 wherein the receiver array includes hydrophones with random increments of spacing along the array such that the receiver array can accommodate multiple frequencies without aliasing.

7. A method for producing multiple frequency transmissions with a parametric sonar, said method comprising the steps of:
- transmitting at least three distinct primary frequencies from at least one source;
- generating a non-linear interaction of acoustic energy at each combination of the distinct primary frequencies;
- forming subsequent to said generating step, at least three acoustic beams, each at a difference frequency by the non-linear interaction of acoustic energy; and
- receiving the acoustic beams with a receiver array;
- wherein said generating step is performed by at least one amplifier and at least one acoustic projector;
- wherein element spacing on the receiver array is less than $\lambda/2$ in order to avoid aliasing, where $\lambda=c/f$ is the wavelength, c is the speed of sound in water and f is the highest difference frequency;
- wherein the receiver array includes hydrophones with increasing increments of spacing along the array such that the receiver array can accommodate multiple frequencies without aliasing.

8. A method for producing multiple frequency transmissions with a parametric sonar, said method comprising the steps of:
- transmitting at least three distinct primary frequencies from at least one source;
- generating a non-linear interaction of acoustic energy at each combination of the distinct primary frequencies;
- forming subsequent to said generating step, at least three acoustic beams, each at a difference frequency by the non-linear interaction of acoustic energy; and
- receiving the acoustic beams with a receiver array;
- wherein said generating step is performed by at least one amplifier and at least one acoustic projector;
- wherein element spacing on the receiver array is less than $\lambda/2$ in order to avoid aliasing, where $\lambda=c/f$ is the wavelength, c is the speed of sound in water and f is the highest difference frequency;
- wherein the receiver array includes hydrophones with random increments of spacing along the array such that the receiver array can accommodate multiple frequencies without aliasing.

* * * * *